US008587138B2

(12) United States Patent
Statler et al.

(10) Patent No.: US 8,587,138 B2
(45) Date of Patent: Nov. 19, 2013

(54) SYSTEMS FOR THE RECOVERY OF GAS AND/OR HEAT FROM THE MELTING OF METALS AND/OR THE SMELTING OF ORES AND CONVERSION THEREOF TO ELECTRICITY

(76) Inventors: Kevin Statler, Newport, AR (US); Fermin Maldonado, Cleburne, TX (US)

( * ) Notice: Subject to any disclaimer, the term of this patent is extended or adjusted under 35 U.S.C. 154(b) by 1027 days.

(21) Appl. No.: 12/455,625

(22) Filed: Jun. 4, 2009

(65) Prior Publication Data

US 2010/0308600 A1 Dec. 9, 2010

(51) Int. Cl.
 F01K 17/02 (2006.01)
 F02C 6/18 (2006.01)

(52) U.S. Cl.
 USPC ................................................ 290/2; 290/43

(58) Field of Classification Search
 USPC ................................................. 290/2, 43, 54
 See application file for complete search history.

(56) References Cited

U.S. PATENT DOCUMENTS

| | | | |
|---|---|---|---|
| 3,223,860 A * | 12/1965 | Brill | 310/11 |
| 3,950,949 A * | 4/1976 | Martin et al. | 60/641.8 |
| 4,342,197 A | 8/1982 | Matthews | |
| 4,376,373 A | 3/1983 | Weber et al. | |
| 4,506,631 A * | 3/1985 | Phong-Anant | 122/2 |
| 4,512,156 A | 4/1985 | Nagase | |
| 4,936,881 A * | 6/1990 | Jorzyk et al. | 96/232 |
| 4,974,411 A | 12/1990 | Bruckner et al. | |
| 5,044,163 A | 9/1991 | Bruckner et al. | |
| 5,311,741 A * | 5/1994 | Blaize | 60/676 |
| 5,687,674 A | 11/1997 | Johanntgen et al. | |
| 6,196,000 B1 | 3/2001 | Fassbender | |
| 6,647,726 B2 * | 11/2003 | Saviharju et al. | 60/653 |
| 6,837,916 B2 * | 1/2005 | Kawakami et al. | 75/380 |
| 6,843,058 B1 * | 1/2005 | Pierce, Jr. | 60/645 |
| 7,055,325 B2 * | 6/2006 | Wolken | 60/648 |
| 7,554,223 B1 * | 6/2009 | Kay | 310/11 |
| 7,851,386 B2 * | 12/2010 | Rao et al. | 442/19 |
| 8,034,219 B2 * | 10/2011 | Peter et al. | 204/263 |
| 2008/0174115 A1 * | 7/2008 | Lambirth | 290/2 |
| 2010/0154381 A1 * | 6/2010 | Rapp et al. | 60/39.181 |
| 2010/0314888 A1 * | 12/2010 | Cognard et al. | 290/1 R |
| 2013/0160448 A1 * | 6/2013 | Gaia et al. | 60/651 |

OTHER PUBLICATIONS

Furukawa, Tsukasa; New Steel Electricity; http://newsteel.com/features/ns9708f5.htm; Aug. 1997.
Hurley, John; Hot New Technology Offers Potential to Cool Global Warming; http://www.eerc.und.nodak.edu/newsletter/record.html; Dec. 15, 1998.

(Continued)

*Primary Examiner* — Tulsidas C Patel
*Assistant Examiner* — Viet Nguyen
(74) *Attorney, Agent, or Firm* — Patents+TMS, P.C.

(57) ABSTRACT

Systems recover gas and/or heat and convert the recovered gas and/or heat to electrical power. The systems recover gas and/or heat from metal melting and/or smelting processes used in the manufacturing and/or refining of metals and/or their by-products. The recovered gas and/or heat are converted into electrical power. The heat of the metal melting and/or smelting process is converted to superheated liquid, such as steam, through a heat exchanger for operating a turbine motor and electrical power generator to produce electrical power. Flue gases from the melting and/or smelting processes used in the manufacturing and/or refining of metals and/or their by-products are utilized to drive a gas turbine motor and electrical power generator to produce electrical power. Electricity generated by the systems electrolyze water to form hydrogen gas and oxygen gas.

7 Claims, 7 Drawing Sheets

(56) References Cited

OTHER PUBLICATIONS

Proctor et al.; Physical and Chemical Characteristics of Blast Furnace, Basic Oxygen Furnace . . . ; Environ. Sci. Technol.; Mar. 18, 2000; vol. 34, pp. 1576-1582.
Cogeneration; http://www.co-generation.com/systemtypes.htm; Mar. 12, 2001.
Steam Turbines; http:webmall.ucbiz.com/power/contents/steamturbine/mail.htm; Mar. 12, 2001.
Jones, Jeremy A.T.; Electric Arc Furnace Steelmaking; http://www.steel.org/learning/howmade/eaf.htm; Mar. 22, 2001.
Steam Turbines; http://library.thinkquest.org/C006011/english/sites/dampfturbine.php3?v=2; Mar. 22, 2001.
Clean Coal Technology Compendium; http://lanl.gov/projects/cctc/factsheets/tidd/tidddemo.html; May 5, 2001.
ThermoEnergy Future Technology Applications; http:www.thermoenergy.com/future.htm; May 8, 2001.
ThermoEnergy Integrated Power System; http://www.thermoenergy.com/clean.htm; May 9, 2001.
Who is ThermoEnergy; http://www.thermoenergy.com/whois.htm; May 9, 2001.
Plant Layout; http://echelon1.mit.edu/~nate/classes/22.33/final/report/node15.html; Aug. 18, 2005.
Hydrogen; http://www.formal.stanford.edu/jmc/progress/hydrogen.html; Sep. 28, 2005.
Electrolysis: Obtaining Hydrogen from Water: The Basis for a Solar-Hydrogen Economy; http://www.nmsea.org/Curriculum/7_12/electrolysis/electrolysis.htm; Oct. 28, 2005.
Carstens, Nate; High Temperature Steam Electrolysis (HTSE); http://echelon1.mit.edu/~nate/classes/22.33/final/report/node28.html; May 25, 2004.
Framing the cost analysis for CO2 sequestration; http:web.dcp.ufl.edu/ckibert/BCN6586/Modules/Module6/ECoRestructuringAyres1998/u . . . ; Aug. 18, 2005.
The New Iron Age; Metal Producing & Processing; May/Jun. 2008; pp. 14-17.

\* cited by examiner

SYSTEMS FOR THE RECOVERY OF GAS AND/OR HEAT FROM THE MELTING OF METALS AND/OR THE SMELTING OF ORES AND CONVERSION THEREOF TO ELECTRICITY

BACKGROUND OF THE INVENTION

The present invention generally relates to systems for the recovery of gas and/or heat and conversion thereof to electrical power. More specifically, the present invention relates to systems for recovering gas and/or heat from melting or smelting processes used in the manufacturing and/or refining of metals and/or their by-products. The recovered gas and/or heat is converted into electrical power. More specifically, the heat may be converted to superheated steam through a heat exchanger for operating a turbine and electrical power generator to produce electrical power. Moreover, flue gases from the melting and/or smelting processes used in the manufacturing and/or refining of metals and/or their by-products drive a gas turbine and electrical power generator to produce electrical power.

It is generally known to melt and/or smelt metals and metal ore in the manufacture and/or refining of metals and their by-products. Generally, smelting is a form of extractive metallurgy that is used to remove metals from unprocessed and unrefined ores. This may include, without limitation, iron extraction from iron ore, copper extraction from copper ore and other base metals from their ores, respectively. In general, smelting utilizes heat and a chemical reducing agent, commonly a fuel that is a source of carbon, such as coke (or, in earlier times, charcoal) to change the oxidation state of the metal ore. The carbon source typically removes oxygen from the ore to leave the relatively pure metal. In addition, since most ores have impurities within them, it is often necessary to use flux, such as limestone, to remove rock gangue as slag.

Melting of metals and/or smelting of metal ores takes place in a furnace. Virgin material, external scrap, internal scrap and/or alloying elements are typically used to charge the furnace. Virgin material refers to commercially pure forms of the primary metal used to form a particular alloy. External scrap is material from other forming processes such as punching, forging or machining. Internal scrap consists of the gates, risers and/or defective castings. Alloying elements are either pure forms of an alloying element, like electrolytic nickel, or alloys of limited composition, such as ferroalloys or master alloys.

Several specialized furnaces are used to melt the metal. Furnaces are refractory-lined vessels that contain the material to be melted and provide the energy to melt it. Modern furnace types include electric arc furnaces, induction furnaces, cupolas, reverberatory furnaces and crucible furnaces. Furnace choice is dependent on the alloy system and the quantities produced. For ferrous materials, electric arc furnaces, cupolas and induction furnaces are commonly used. Reverberatory and crucible furnaces are common for producing aluminum castings.

Moreover, furnaces are designed based on several factors, including but not limited to size and the type of metals that are to be melted. Furnaces are further designed around the fuel being used to produce the desired temperature. For low temperature melting point alloys, electricy, propane and natural gas are typically used. For high melting point alloys, such as steel or nickel-based alloys, the furnace must be designed for very high temperatures and typically utilize electricity or coke as the fuel source.

In general with respect to smelting of metal ores, the ores are typically metal oxides and/or sulfides. In a typical first step, the ore or metal is melted and two liquids are formed: one, a slag containing most of the impurities; and two, a sulfide matte containing the metal sulfide, metal atoms in elemental form and some impurities. Fuel is burned during this process, and the heat generated melts the dry sulfide concentrates. The slag floats on top of the heavier matte and is removed, discarded and/or recycled. The matte is then sent to a refiner or a converter for converting to a pure metal.

Slag is a vitreous by-product of smelting ore and melting steel and/or other metals to purify these metals. The bulk of the slag contains impurities, but slag may also contain residual metals. While slags are generally used as a waste removal mechanism, they can also serve other purposes, such as assisting in smelt temperature control and minimizing re-oxidation of the final liquid metal product before casting.

The slag may go through further processing to remove any of the residual metals, and the cooled and separated resulting slag may be utilized as a material, such as a filler and/or aggregate for road construction and/or site construction, for example.

It should be noted that the description herein describes a general process for the production of metals from a melting and/or smelting process; however, other processes may or may not use carbon or coke, or may differ from processes described herein, such as for the production of aluminum. These processes are still referred to as a melting and/or smelting process for purposes of the present invention.

It is also generally known to use steam and hot gases to generate electricity. The so-called "Rankine Cycle" is a thermodynamic process that utilizes water in a closed loop system to convert heat into work. Heat is generated or utilized from a variety of sources to heat water into steam as a working fluid. The steam then drives one or more turbines to generate electricity via an electric generator. The steam then cools and is recycled back to be reheated yet again. The process then continues the cycle as long as there is a fuel to heat the water into steam. It is estimated that approximately 80% of the world's energy production comes from use of the Rankine Cycle.

One source of energy used to convert liquid water to steam to drive turbines to generate electricity comes from geothermal energy sources. For example, steam may be utilized directly from underground sources, such as an underground steam reservoir, or cycled through an underground heat source. When water converts to steam, it rapidly expands, thereby driving a steam turbine and generator to generate electricity. The steam may then be condensed and injected into the steam reservoir or recycled to the heat source. The steam is typically condensed using relatively cool water cycled, there through, where a heat transfer occurs. Another type of power plant is a binary power plant, that pumps heated water from a fuel source to a heat exchanger where a second fluid with a relatively low boiling point, such as butane or pentane hydrocarbon, is vaporized and drives a turbine.

In addition to water, other gases may be utilized to drive a turbine to generate electricity. For example, a fuel source, such as natural gas, hydrogen gas, or the like, may burn in a furnace with the addition of oxygen or air. The rapid expansion of the gas rushes past turbine blades, thereby spinning the turbine blades thereby generating electricity in a generator.

Alternatively, gases may be utilized that are the residual product of a furnace or of a material that off-gasses. These gases may be routed to a turbine to generate electricity.

In a combined cycle process, fuel is burned and gases made therefrom turn turbine blades to generate electricity. The burned fuel then is released into a heat exchanger in a first generator where its heat vaporizes water in conduit into steam. The steam then drives a second turbine to generate electricity in a second generator, where the steam is cooled and condensed and recycled to the boiler in a closed loop system.

It is also generally known to generate hydrogen and oxygen through electrolysis of water. Specifically, an electrical current is passed through water to decompose or hydrolyze the water ($H_2O$) into component molecules of hydrogen ($H_2$) and oxygen ($O_2$). Both hydrogen and oxygen can be utilized in industrial applications. Hydrogen, specifically, can be burned as a fuel.

As noted above, the melting and/or smelting of metals and/or ores to purify the metals utilizes extremely high heat and various reductive chemical reactions. Typically, this heat that is generated to melt and refine the metals and/or ores and form purified metals therefrom is typically wasted. For example, in the melting and/or smelting vessel, heat is utilized to melt the ores to form a liquid metal matte. In addition, hot gases may be produced from the liquid metal matte that are typically lost during the smelting process.

In a typical melting and/or smelting process, water-cooled steel vessels are utilized in the furnace for the melting of metals and/or reduction of metal ore to pure metals. The steel vessels typically have water-cooled panels that form the walls of the steel vessels as well as the roofs of the steel vessels. The panels typically have a plurality of water coils disposed therein circulating water therethrough to keep the melting and/or smelting vessel from melting and to regulate the temperature of the liquid metal and/or slag. The water then circulates to a cooling pond and/or a cooling tower where heat is transferred, thereby cooling the water for recirculating through the panels. Typically, water from the panels can exceed 600 degrees F, whereupon they are delivered to the cooling ponds whereupon they decrease in temperature to enter cooling towers at about 200 degrees F.

Impurities form the slag, which may float on the top of the liquid metal matte in the melting and/or smelting vessel. The slag is also at extremely high temperatures, and is typically removed from the liquid metal matte to undergo further processing in a slag pot to extract any residual metals in the slag. This process produces much heat and off-gassing as well. After the slag is sufficiently processed, it is typically removed from the melting and/or smelting process and disposed in a slag box, for example, and cooled. Much slag is recycled into industrial products, such as road aggregate, fertilizer, cement, and other products.

The liquid metal matte further undergoes refining at high temperatures to form pure or relatively pure metal product. The pure metal product is typically cooled and formed into a shape for transport.

At each stage of the melting and/or smelting process, high heat is generated to institute these steps. Moreover, hot gases are also be off-gassed. In a typical melting and/or smelting process, the heat and gases are typically lost.

A need, therefore, exists for systems for utilizing heat generated during the melting and/or smelting process. More specifically, a need exists for systems for generating electricity from heat generated during the melting and/or smelting process.

Moreover, a need exists for systems for utilizing hot gases from the melting and/or smelting process. More specifically, hot gases generated during the melting and/or smelting process may be utilized to generate electricity in gas turbines.

Further, a need exists for systems for utilizing both the heat generated by a melting and/or smelting process and the gases produced by the melting and/or smelting process. More specifically, a need exists for systems for cogenerating electricity utilizing both the heat and the gases produced during the melting and/or smelting process.

Still further, a need exists for systems for generating power from the heat, the gases, or both the heat and the gases produced during a melting and/or smelting process. More specifically, a need exists for systems for generating electricity from the heat, the gases or both the heat and the gases produced during a melting and/or smelting process.

In addition, a need exists for systems for utilizing electricity generated using the heat, the gases, or both the heat and the gases produced during the melting and/or smelting process. More specifically, a need exists for systems for sending the electricity into a power utility grid or reverse metering the electricity.

Moreover, a need exists for systems for utilizing electricity generated using the heat, the gases, or both the heat and the gases produced during a melting and/or smelting process for the electrolysis of water. More specifically, a need exists for systems for utilizing electricity generated using the heat, the gases, or both the heat and the gases produced during a melting and/or smelting process for generating hydrogen gas, oxygen gas or both hydrogen gas and oxygen gas by the electrolysis of water.

SUMMARY OF THE INVENTION

The present invention generally relates to systems for the recovery of gases and/or heat and conversion thereof to electrical power. More specifically, the present invention relates to systems for recovering gases and/or heat from melting and/or smelting processes used in the manufacturing and/or refining of metals and/or their by-products. The recovered gases and/or heat are converted into electricity. More specifically, the heat may be converted to superheated steam through a heat exchanger for operating a steam turbine motor and electrical power generator to produce electrical power. Moreover, flue gases from the melting and/or smelting processes used in the manufacturing and/or refining of metals and/or their by-products may be utilized to drive a gas turbine motor and electrical power generator to produce electrical power.

To this end, in an embodiment of the present invention, a system for generating electricity during a metal melting and/or smelting process is provided. The system comprises a vessel containing heated material generated during the melting and/or smelting process; a conduit containing a liquid within the conduit wherein the conduit is disposed in close proximity to the vessel wherein the liquid contained within the conduit vaporizes due to heat from the vessel and the heated material generated during the melting and/or smelting process; a first turbine connected to the conduit wherein the vaporized liquid drives the first turbine; and a first electricity generator connected to the first turbine wherein the first electricity generator generates electricity when the first turbine is driven by the vaporized liquid.

In an embodiment, the liquid within the conduit is water.

In an embodiment, the system further comprises a furnace wherein the vessel is disposed within the furnace.

In an embodiment, the conduit is disposed within the vessel.

In an embodiment, the system further comprises a vessel roof disposed on the vessel wherein the conduit is attached to the vessel roof.

In an embodiment, the system further comprises a furnace wherein the furnace has a gas conduit for the routing of heated gases from the vessel.

In an embodiment, the system further comprises a channel connecting the vessel to a second vessel for transporting a portion of the heated material to the second vessel and further wherein a second conduit containing a second liquid is disposed in close proximity to the second vessel wherein the liquid contained within the conduit vaporizes due to heat from the second vessel.

In an embodiment, the system further comprises a flue gas conduit disposed above the vessel for capturing flue gases emanating from the vessel wherein the flue gas conduit routes the flue gases to a second turbine.

In an embodiment, the heated material within the vessel is heated metal ore.

In an embodiment, the heated material within the vessel is slag.

In an embodiment, the heated material within the vessel is liquid metal.

In an embodiment, the system further comprises a gas turbine wherein gases from the vessel drive the gas turbine.

In an embodiment, the system further comprises a first condenser connected downstream from the first turbine wherein the vaporized liquid flows into the first condenser after driving the first turbine wherein the vaporized liquid condenses within the first condenser.

In an embodiment, the system further comprises an electrolysis system having water and electrodes wherein the electricity generated from the first electricity generator is directed to the electrodes and electrolyzes the water producing hydrogen gas and oxygen gas.

In an alternate embodiment of the present invention, a system for generating electricity during a metal melting and/or smelting process is provided. The system comprises a vessel containing heated material generated during melting and/or smelting of metal ore to form a metal; flue gases emanating from the vessel; a flue gas conduit for routing the flue gases from the vessel; a gas turbine connected to the flue gas conduit wherein the flue gases are routed to the gas turbine and drive the gas turbine; and a first electricity generator connected to the gas turbine wherein the first electricity generator generates electricity when the gas turbine is driven by the flue gases.

In an embodiment, the system further comprises a liquid-filled conduit wherein heat from the flue gases vaporize liquid within the liquid-filled conduit for driving a second turbine.

In an embodiment, the system further comprises a liquid-filled conduit disposed in close proximity to the vessel wherein heat from the vessel vaporizes liquid within the liquid-filled conduit for driving a second turbine.

In an embodiment, the system further comprises a second vessel containing heated material and a liquid-filled conduit disposed in close proximity to the second vessel wherein heat from the second vessel vaporizes liquid within the liquid-filled conduit for driving a second turbine.

In an embodiment, the system further comprises an electrolysis system having water and electrodes wherein the electricity generated from the first electricity generator is directed to the electrodes and electrolyzes the water producing hydrogen gas and oxygen gas.

In an alternate embodiment of the present invention, a system for producing hydrogen gas and oxygen gas from a smelting process is provided. The system comprises a turbine driven by at least one of heat and gases generated during metal melting and/or smelting in the production of a purified metal; an electricity generator connected to the turbine for producing electricity when the turbine is driven by the heat generated during the metal melting and/or smelting; and an electrolysis system having water wherein the electrolysis system is electrically connected to the electricity generator wherein the electricity generated by the electricity generator electrolyzes the water into the oxygen gas and the hydrogen gas.

It is, therefore, an advantage of the present invention to provide systems for utilizing heat generated during the melting and/or smelting process. More specifically, it is an advantage of the present invention to provide systems for generating electricity from heat generated during the melting and/or smelting process.

Moreover, it is an advantage of the present invention to provide systems for utilizing hot gases from the melting and/or smelting process. More specifically, it is an advantage of the present invention to utilize gases generated during the melting and/or smelting process to generate electricity in gas turbines.

Further, it is an advantage of the present invention to provide systems for utilizing both the heat generated by a melting and/or smelting process and the gases produced by the melting and/or smelting process. More specifically, it is an advantage of the present invention to provide systems for cogenerating electricity utilizing both the heat and the gases produced during the melting and/or smelting process.

Still further, it is an advantage of the present invention to, provide systems for generating power from the heat, the gases, or both the heat and the gases produced during a melting and/or smelting process. More specifically, it is an advantage of the present invention to provide systems for generating electricity from the heat, the gases or both the heat and the gases producing during a melting and/or smelting process.

In addition, it is an advantage of the present invention to provide systems for utilizing electricity generated using the heat, the gases, or both the heat and the gases produced during the melting and/or smelting process. More specifically, it is an advantage of the present invention to provide systems for sending the electricity into a power utility grid or reverse metering the electricity.

Moreover, it is an advantage of the present invention to provide systems for utilizing electricity generated using the heat, the gases, or both the heat and the gases produced during the melting and/or smelting process for the electrolysis of water. More specifically, it is an advantage of the present invention to provide systems for utilizing electricity generated using the heat, the gases, or both the heat and the gases produced during the melting and/or smelting process for generating hydrogen gas, oxygen gas or both hydrogen gas and oxygen gas by the electrolysis of water.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to systems for the recovery of gases and/or heat and conversion thereof to electrical power. More specifically, the present invention relates to systems for recovering gas and/or heat from metal melting and/or smelting processes used in the manufacturing and/or refining of metals and/or their by-products. The present invention further converts the recovered gas and/or heat into electrical power. More specifically, the heat may be converted to superheated steam through a heat exchanger for operating a steam turbine motor and electrical power generator to produce electrical power. Moreover, heated flue gases from the metal melting and/or smelting processes used in the manufacturing and/or refining of metals and/or their by-products may be utilized to drive a gas turbine motor and electrical power generator to produce electrical power.

In general, the present invention captures gases and/or heat generated at any stage of the melting and/or smelting of metals that would normally be wasted. The embodiments described herein provide particular preferred ways of capturing gases and/or heat. However, the invention encompasses all ways of capturing gases and/or heat at any stage of the production of metal from metal ore in a metal melting and/or smelting process.

Figure 1:
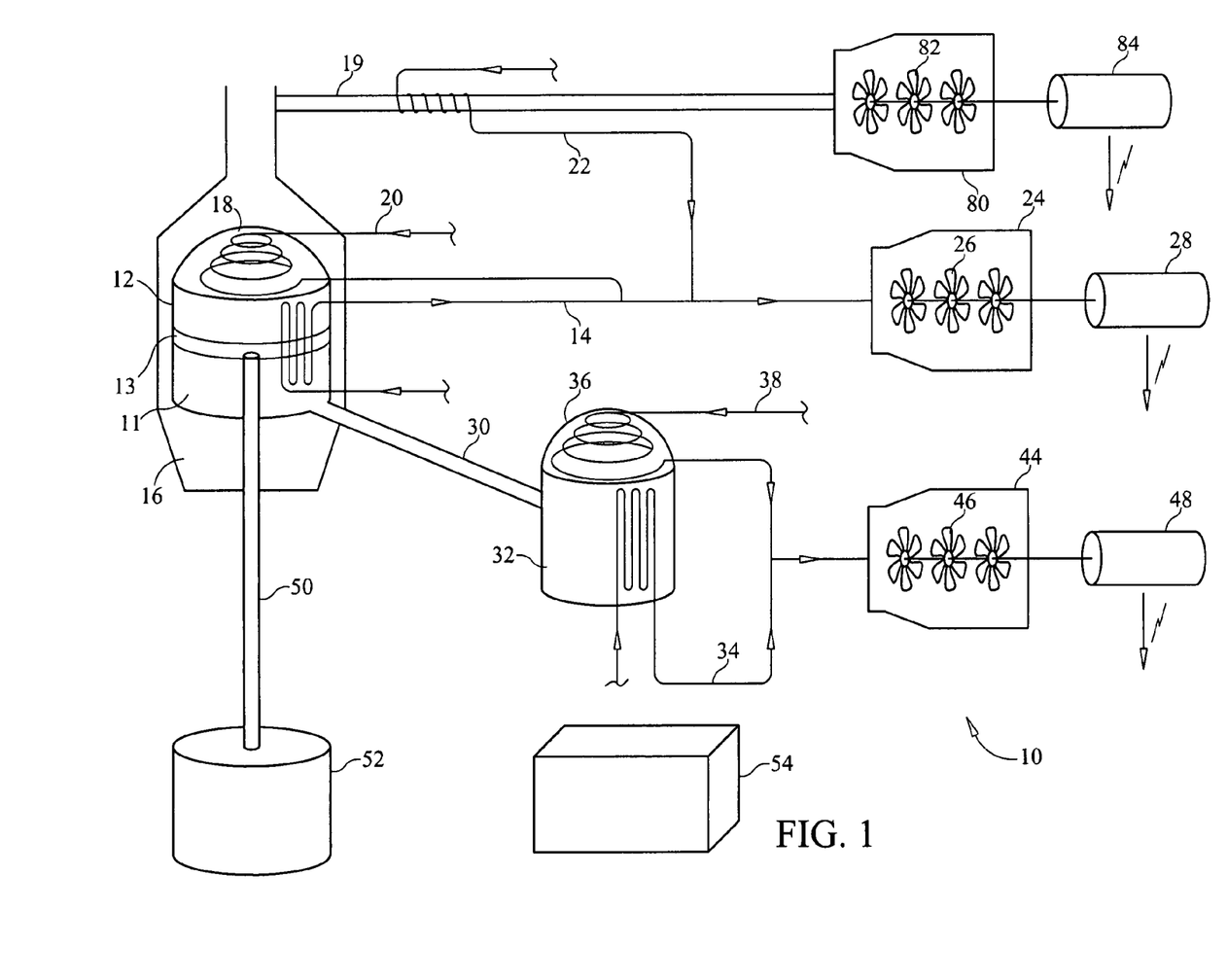
FIG. 1 is a system for driving turbines from heat and gases generated during a metal melting and/or smelting process in an embodiment of the present invention.

Therefore, an embodiment of the present invention is illustrated in Figures and the present description, as described herein, wherein like numerals refer to like parts. FIG. 1 illustrates a metal melting and/or smelting system 10. The metal melting and/or smelting system 10 includes a liquid-cooled metal melting and/or smelting vessel 12 having one or a plurality of liquid-filled conduit 14 disposed therein and/or therearound. The metal melting and/or smelting vessel 12 is typically disposed within a furnace 16, such as a blast furnace, electric arc furnace, induction furnace, cupola, reverberatory furnace, crucible furnace, or any other furnace apparent to one having ordinary skill in the art, for heating and melting metal and/or disposed within the metal melting and/or smelting vessel 12. The furnace 16 may include components apparent to one having ordinary skill in the art. For example, the furnace 16 may include an emission control unit 19 including duct-work for capturing heated gases and emission off-gassed during a metal melting and/or smelting process.

The liquid within the liquid-filled conduit 14 is typically water, but may be any liquid apparent to one having ordinary skill in the art for the transfer of heat thereto. The liquid-filled conduit 14 of the metal melting and/or smelting vessel 12 may allow for extremely high temperatures within the metal melting and/or smelting vessel 12 and reduce the risk of melting of the metal melting and/or smelting vessel 12 due to the high heat. The heat, however, may be utilized to ultimately drive a turbine to generate electricity, as described below. The metal melting and/or smelting vessel 12 may be a typical vessel for the heating and reduction of liquid metal and/or metal ore to form a liquid metal matte 11 and a slag 13. The metal melting and/or smelting vessel 12 typically withstands the temperatures of the metal melting and/or smelting process due to the liquid-filled conduit 14.

As described herein, the metal melting and/or smelting vessel 12 includes first liquid-filled conduit 14, illustrated herein generally disposed around the metal melting and/or smelting vessel 12, to cool or otherwise maintain the temperature of the metal melting and/or smelting process. First liquid-filled conduit 14 is representative of a plurality of liquid-filled conduit that may be disposed in and/or around the vessel 12. As noted above, the liquid within the liquid-filled conduit 14 may be water, but may further be any liquid apparent to one having ordinary skill in the art for the transfer of heat to drive a turbine to generate electricity, as noted below.

Moreover, the metal melting and/or smelting vessel 12 may include a roof 18 further including one or more liquid-filled conduit 20 disposed therein or thereon. Additionally, liquid-filled conduit may further be disposed within the vessel 12 (not shown) for capturing heat within the vessel 12.

Moreover, liquid-filled conduit 22 may be associated with the duct-work of the emission control unit 19 that is associated with the furnace 16. Heated gases may flow through the emission control unit 19 and may transfer heat to the liquid-filled conduit 22 associated with the emission control unit 19.

The liquid-filled conduit 14, 20, 22 of the metal melting and/or smelting vessel 12, the roof 18, and/or the emission control unit 19, allows relatively cool liquid, such as water, to be pumped or otherwise routed throughout the conduit providing for a heat transfer from the metal melting and/or smelting vessel 12 and the heated contents of the vessel 12 (typically including the liquid metal matte 11 and/or slag 13), the roof 18, and/or the emission control unit 19 to the liquid within the liquid-filled conduit. The liquid within the liquid-led conduit may be routed from the smelting vessel 12, the roof 18, and/or the emission control unit 19 at very high temperatures as pressurized gas.

It should be noted that the liquid contained within the liquid-filled conduit 14, 20, 22 of the present invention may be routed through the conduit 14, 20, 22 from relatively cool liquid sources, such as water from rivers, lakes, ponds, underground sources and the like. Alternatively, the liquid within the liquid-filled conduit 14, 20, 22 may be recirculated from the systems of the present invention, as described herein.

If the liquid is water, of course, pressurized steam is typically generated. For example, the steam may typically exceed 600 degrees F. at this point and may approach temperatures as high as, for example, 1600 degrees F. or more. In a typical metal melting and/or smelting process, this steam condenses and typically flows to a cooling pond whereupon it may be subsequently decreased in temperature and then sent to a cooling tower to additionally cool prior to being, ultimately, recirculated through the cooling panels of the vessel 12 to effectuate repeated heat transfers. This cycle may continue throughout the metal melting and/or smelting process to control the heat of the vessel and the contents thereof.

In an embodiment of the present invention, the heat transferred to the liquid within the liquid-filled conduit 14, 20, 22 is utilized to drive one or more turbines to generate electricity. As illustrated in FIG. 1, the high temperature liquid, typically as steam, exiting the liquid-filled conduit enters a turbine 24, whereupon the steam drives one or a plurality of turbine blades 26 thereby generating electricity in a generator 28.

Heated gases removed from the metal melting and/or smelting vessel 12 through the emission control unit 19 may be routed to a gas turbine 80 thereby driving the gas turbine 80 by rotating a plurality of turbine blades 82 thereby generating electricity in an electricity generator 84.

The heated and reduced metal ore may be removed from the metal melting and/or smelting vessel 12 via a channel 30 from the vessel 12 as unrefined liquid metal and disposed within a refining vessel 32 for further processing to form a relatively pure metal, as apparent to one having ordinary skill in the art. The refining vessel 32 may have liquid-filled conduit 34 disposed in and around the refining vessel 32 for capturing heat from the unrefined liquid metal as it is further processed. Moreover, the refining vessel 32 may include a ladle cover 36 disposed atop the refining vessel also having liquid-filled conduit 38. Again, the liquid is preferably water, but any liquid may be utilized to transfer heat thereto, as apparent to one having ordinary skill in the art. As with the smelting vessel 12 within the furnace 16, as described above, the liquid within the liquid-filled conduit 34, 38 may reach very high temperatures and vaporize.

The heat transferred to the liquid within the liquid-filled conduit 34, 38 is utilized to drive one or more turbines to generate electricity. As illustrated in FIG. 1, the high temperature liquid, typically as steam, exiting the liquid-filled conduit 34, 38 disposed in and around the refining vessel 32 enters a turbine 44 whereupon the steam drives one or a plurality of turbine blades 46 thereby generating electricity in a generator 48.

The slag 13 that is generated by the metal melting and/or smelting process is typically removed from the vessel 12 at extremely high temperatures. Typically, the slag 13 is reprocessed in a slag pot to remove residual metals and then cooled. Slag is typically used in industrial applications, such as in road aggregate and/or as fertilizer. As illustrated in FIG. 1, a channel 50 is typically disposed within the metal melting and/or smelting vessel 12 to remove the slag 13 that typically floats atop the liquid metal matte 11. The slag 13 may then flow to a slag pot 52 through the channel 50. In the slag pot 52, the slag 13 may be reprocessed to remove residual metal or otherwise processed as apparent to one having ordinary skill in the art. The slag pot 52 may typically be movable to allow the slag to be transported to a slag box 54, hopper, trench, or other cooling area apparent to one having ordinary skill in the art, for cooling the slag 13 for transfer from the facility for use in industrial applications, such as, for example, as a fertilizer and/or in a road aggregate.

Figure 2:
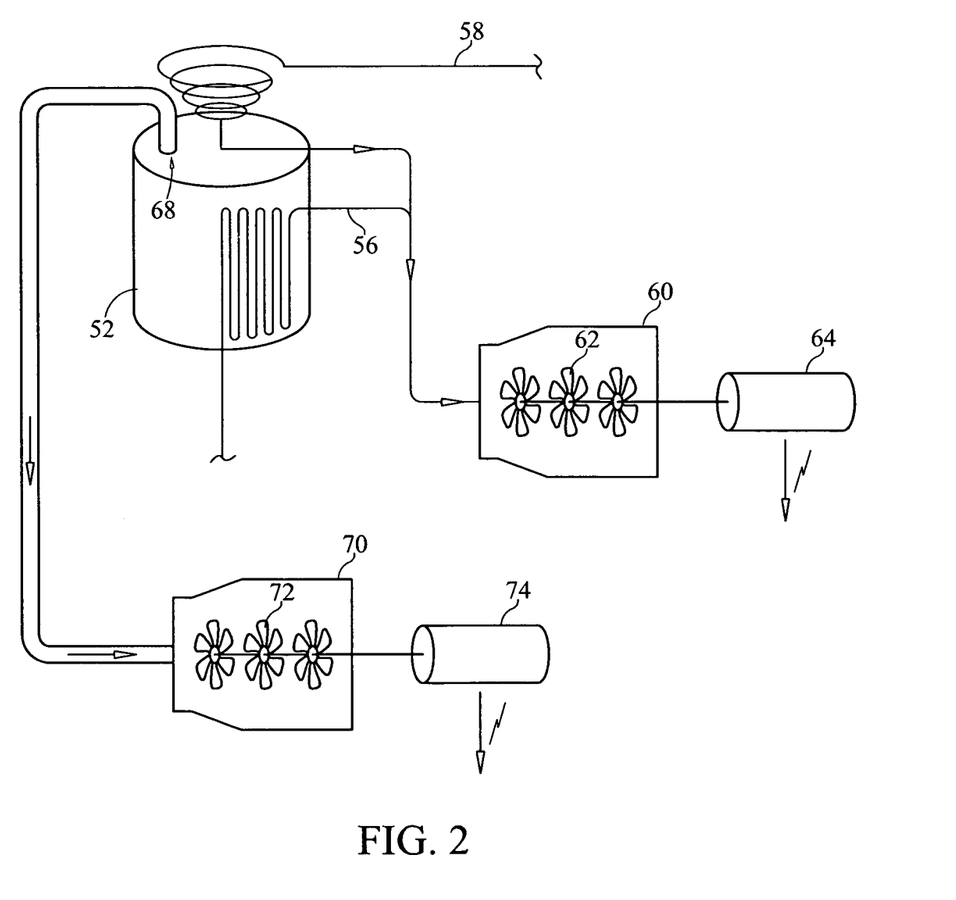
FIG. 2 illustrates a system for driving turbines from heat and gases generated from a slag pot in an embodiment of the present invention.

In an embodiment of the present invention, as illustrated in FIG. 2, the slag pot 52 may include liquid-filled conduit 56 disposed around the slag pot 52 for effectuating a heat transfer between the slag 13 within the slag pot 52 and the liquid within the liquid-filled conduit 56. In a further embodiment of the present invention, submersible liquid-filled conduit 58 may be disposed within the slag pot 52 in direct contact with the slag 13 to further effectuate a heat transfer between the slag 13 and the liquid within the submersible liquid-filled conduit 58. The liquid within the liquid-filled conduit 56 and/or the submersible liquid-filled conduit 58 may preferably be water, although any other liquid may be utilized as apparent to one having ordinary skill in the art.

The heated liquid, typically as pressurized steam, generated by the heat transfer between the slag 13 and the liquid-filled conduit 56 and/or the submersible liquid-filled conduit 58 may drive a turbine to generate electricity. Specifically, as illustrated in FIG. 2, the pressurized steam generated by the heat transfer from the slag 13 to the liquid within the liquid-filled conduit 56 and/or the submersible liquid-filled conduit 58 may enter a turbine 60, whereupon the steam drives a plurality of turbine blades 62 thereby generating electricity in a generator 64.

Alternatively or in addition to the liquid-filled conduit 56 and/or the submersible liquid-filled conduit 58, heated flue gases 68 may be removed from the slag 13 due to off-gassing of the slag 13. The heated gases 68 may be routed to a gas turbine 70, whereupon the heated gases 68 drive a plurality of turbine blades 72 thereby generating electricity in a generator 74.

Figure 3:
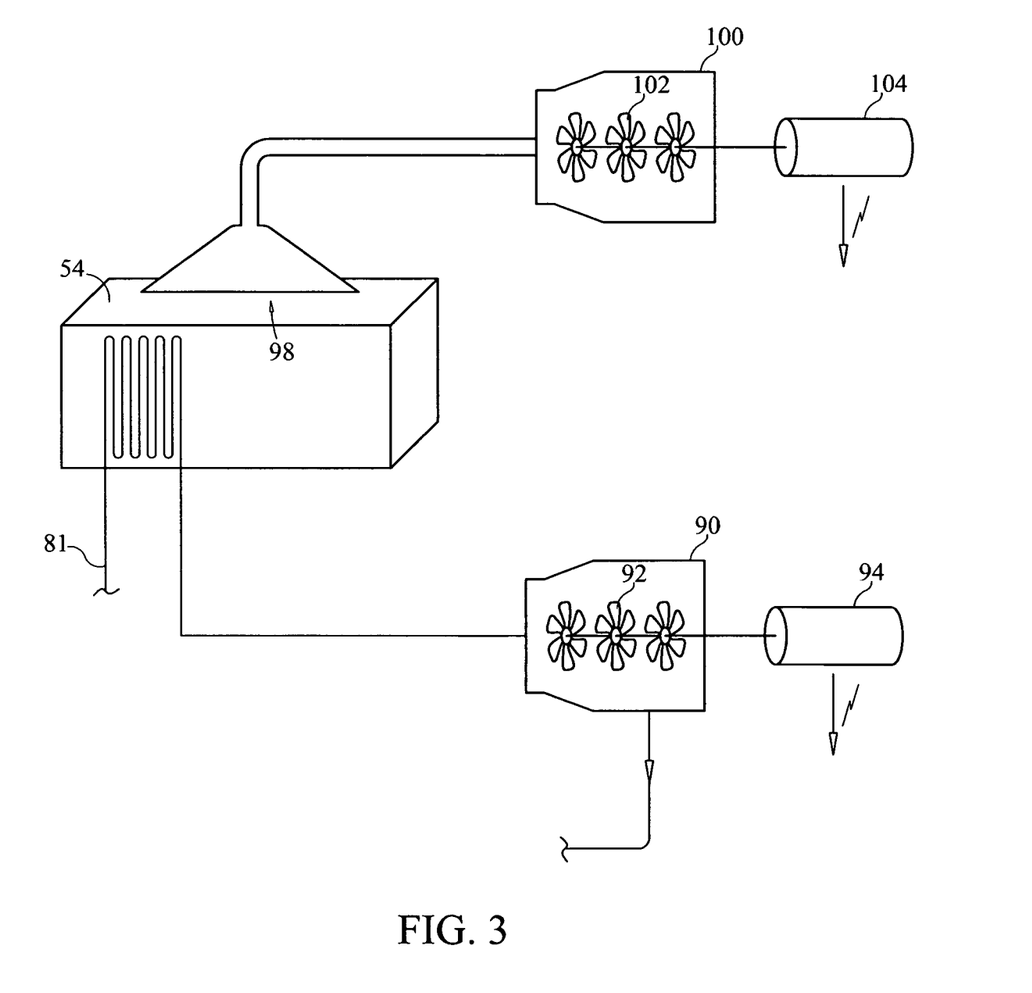
FIG. 3 illustrates a system for driving turbines from heat and gases generated from a slag box in an embodiment of the present invention.

After further processing in the slag pot 52 and/or transfer of the slag 13 contained therein, the slag 13 is typically disposed in a slag box, hopper, a trench or other cooling area, for cooling of the slag 13. FIG. 3 illustrates a slag box 54 where the slag 13 may be typically cooled after transfer from the slag pot 52. Liquid-filled conduit 81 may be provided therein and/or therearound the slag box 54 for transfer of the heat from the cooling slag 13 to liquid contained within the liquid-filled conduit 81. The heat transferred to the liquid within the liquid-filled conduit 81 may be routed to a turbine 90, whereupon the heated liquid, typically as steam, may drive turbine blades 92 thereby generating electricity in a generator 94. The liquid may exit the turbine 90 and condensed and/or recirculated back to the liquid-filled conduit 81 or be utilized in any other way in the systems of the present invention, as apparent to one having ordinary skill in the art.

In a further embodiment of the present invention, heated flue gases 98 may be collected from the cooling slag 13 contained within the slag box 54 for driving a gas turbine 100, whereupon the heated flue gases 98 may drive turbine blades 102 thereby generating electricity in a generator 104.

Figure 4:
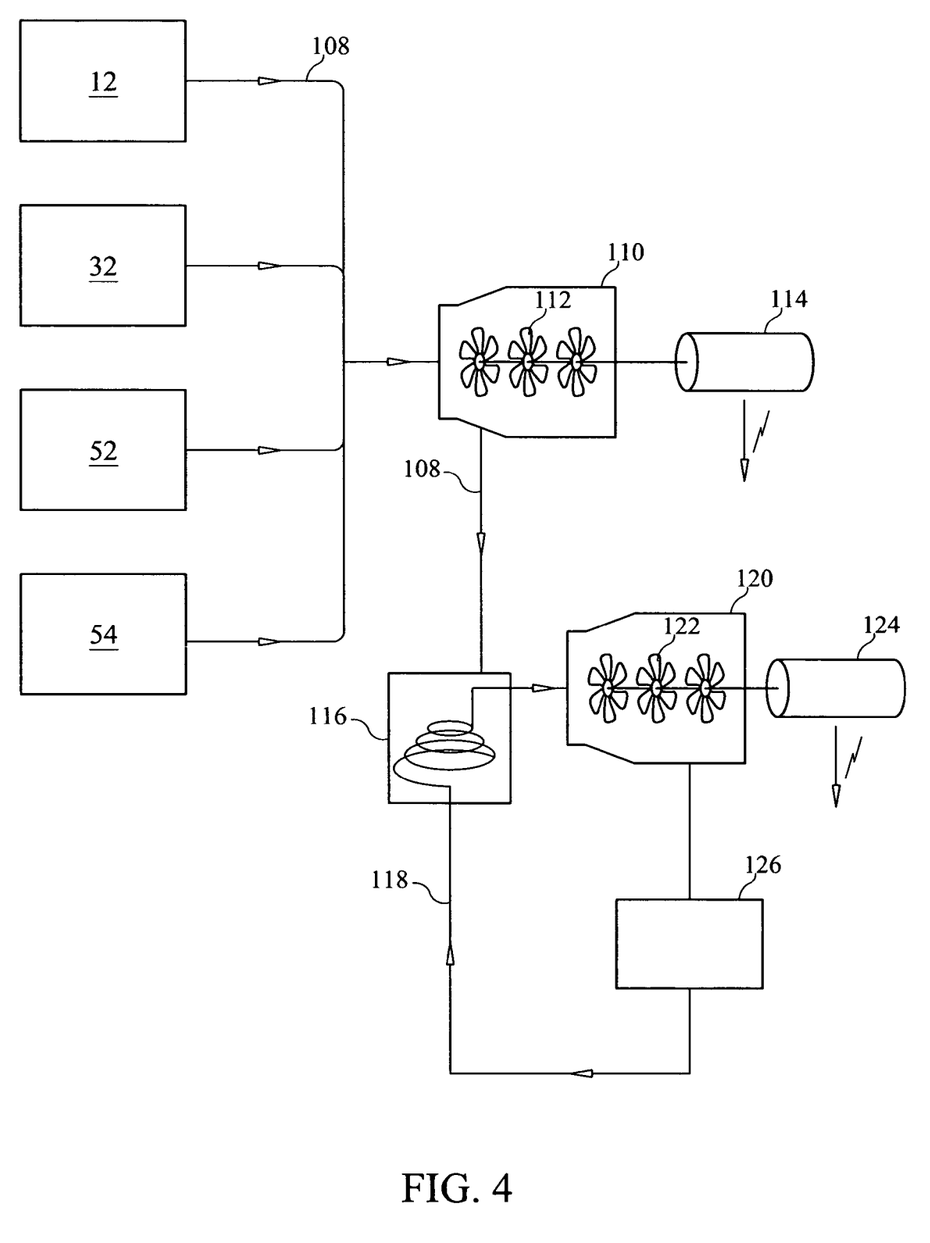
FIG. 4 illustrates a system for driving turbines from heat and gases generated from a metal melting and/or smelting vessel, a refining vessel, a slag pot and a slag box in an embodiment of the present invention.

In an alternate embodiment of the present invention, heated flue gases generated within the vessel 12, the refining vessel 32, the slag pot 52 and/or the slag box 54 may be further utilized to heat liquid, preferably water, in a heat exchanger to further drive a turbine to generate electricity in a combined cycle process. Specifically, as shown in FIG. 4, heated gases from the metal melting and/or smelting vessel 12, the refining vessel 32, the slag pot 52 and/or the slag box 54 may drive a gas turbine 110 having a plurality of turbine blades 112 to generate electricity in a generator 114. It should be noted that while the present embodiments described as having heated flue gases from the metal melting and/or smelting vessel 12, the refining vessel 32, the slag pot 52 and/or the slag box 54 to a single turbine to generate electricity, it should be noted that a plurality of turbines may be utilized for the heated flue gases to be routed thereto, and the invention should not be limited as herein described or shown in FIG. 4.

The heated gases may then enter a heat exchanger 116 through conduit 108 whereupon the heated gases heat liquid within liquid-filled conduit 118. Preferably, the liquid is water although other liquids are contemplated by the present invention, including liquids having lower boiling temperatures. The liquid becomes heated and vaporizes, thereby driving a turbine 120 having one or a plurality of turbine blades 122 to generate electricity in a generator 124. The liquid may condense in a condenser 126, be cooled, and recirculate into the heat exchanger 116 to further drive the turbine 120 when heated again via the heated flue gases from the metal melting and/or smelting vessel 12, the refining vessel 32, the slag pot 52 and/or the slag box 54. The flue gases, upon leaving the heat exchanger 116, may be cleaned, scrubbed, captured, released or disposed of as apparent to one having ordinary skill in the art.

Figure 5:
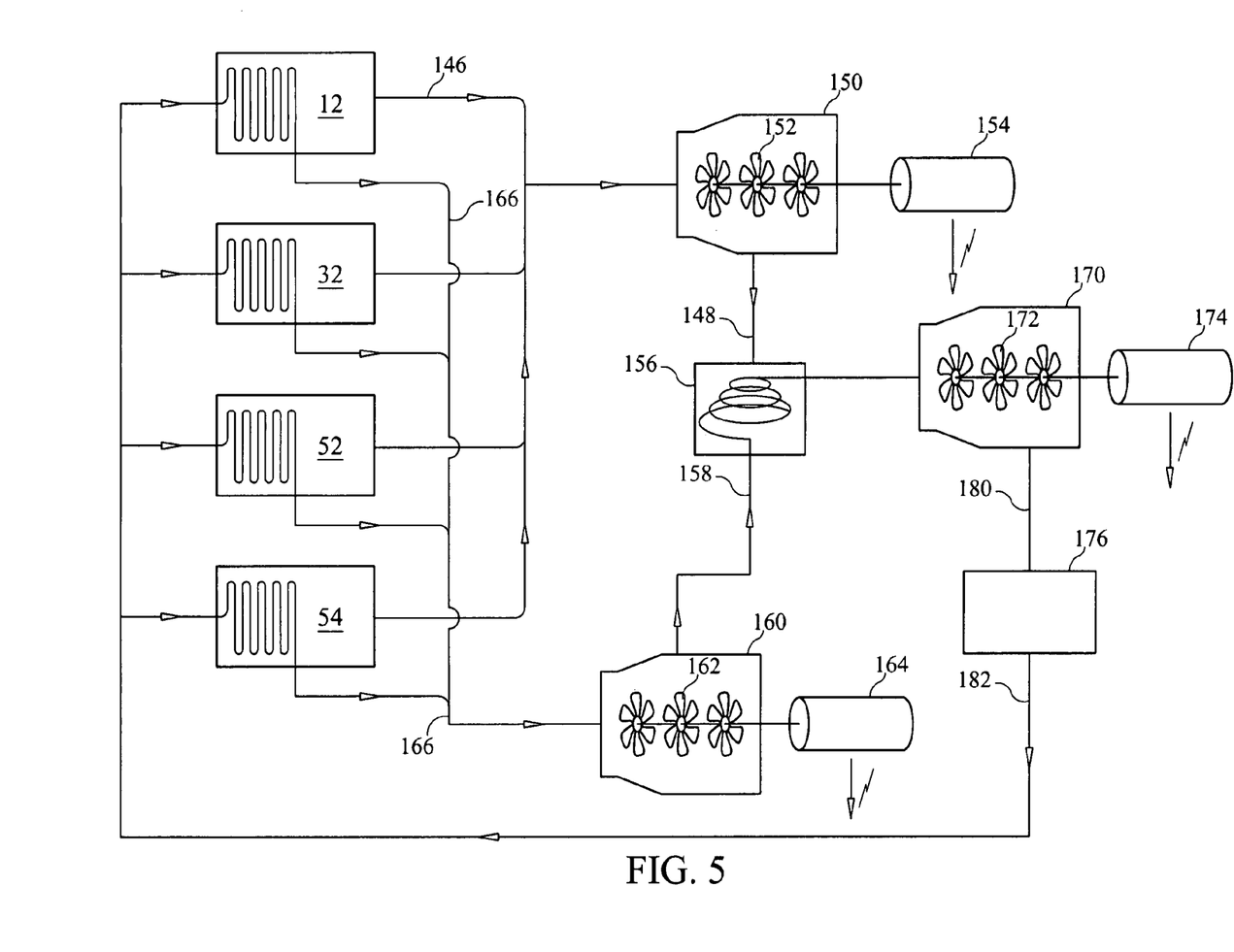
FIG. 5 illustrates a system for driving turbines from heat and gases generated from a metal melting and/or smelting vessel, a refining vessel, a slag pot and a slag box in an alternate embodiment of the present invention.

In a still further alternate embodiment of the present invention, illustrated in FIG. 5, a combined cycle process of the present invention is illustrated. As in the system illustrated in FIG. 4, heated flue gases generated by the metal melting and/or smelting vessel 12, the refining vessel 32, the slag pot 52 and/or the slag box 54 may be further utilized to heat liquid, preferably water, in a heat exchanger to further drive a turbine to generate electricity in a combined cycle process. Specifically, as shown in FIG. 5, heated gases from the vessel 12, refining vessel 32, the slag pot 52 and/or the slag box 54 may be routed via conduit 146 to drive a turbine 150 having a plurality of turbine blades 152 to generate electricity in a generator 154. The heated flue gases may then enter a heat exchanger 156 via conduit 148 whereupon the heated flue gases heat liquid within liquid-filled conduit 158. Preferably, the liquid is water although other liquids are contemplated by the present invention, including liquids having lower boiling temperatures than water. The liquid within the liquid-filled conduit 158, however, may come from liquid-filled conduit 166 associated with the smelting vessel 12, the refining vessel 32, the slag pot 52 and/or the slag box 54, as described above.

As shown in FIG. 5, the liquid from the liquid-filled conduit 166 associated with the metal melting and/or smelting vessel 12, the refining vessel 32, the slag pot 52 and/or the slag box 54 may first drive a turbine 160 having a plurality of turbine blades 162 to generate electricity using a generator 164. The liquid, after driving turbine 160, may be routed to the heat exchanger 156 via conduit 158.

The liquid flowing through the heat exchanger 156 is heated by the flue gases and vaporized thereby driving a turbine 170 having one or a plurality of turbine blades 172 to generate electricity in a generator 174. The liquid may condense in a condenser 176, be cooled, and ultimately recirculate to the metal melting and/or smelting vessel 12, the refining vessel 32, the slag pot 52 and/or the slag box 54 via conduit 182.

Figure 6:
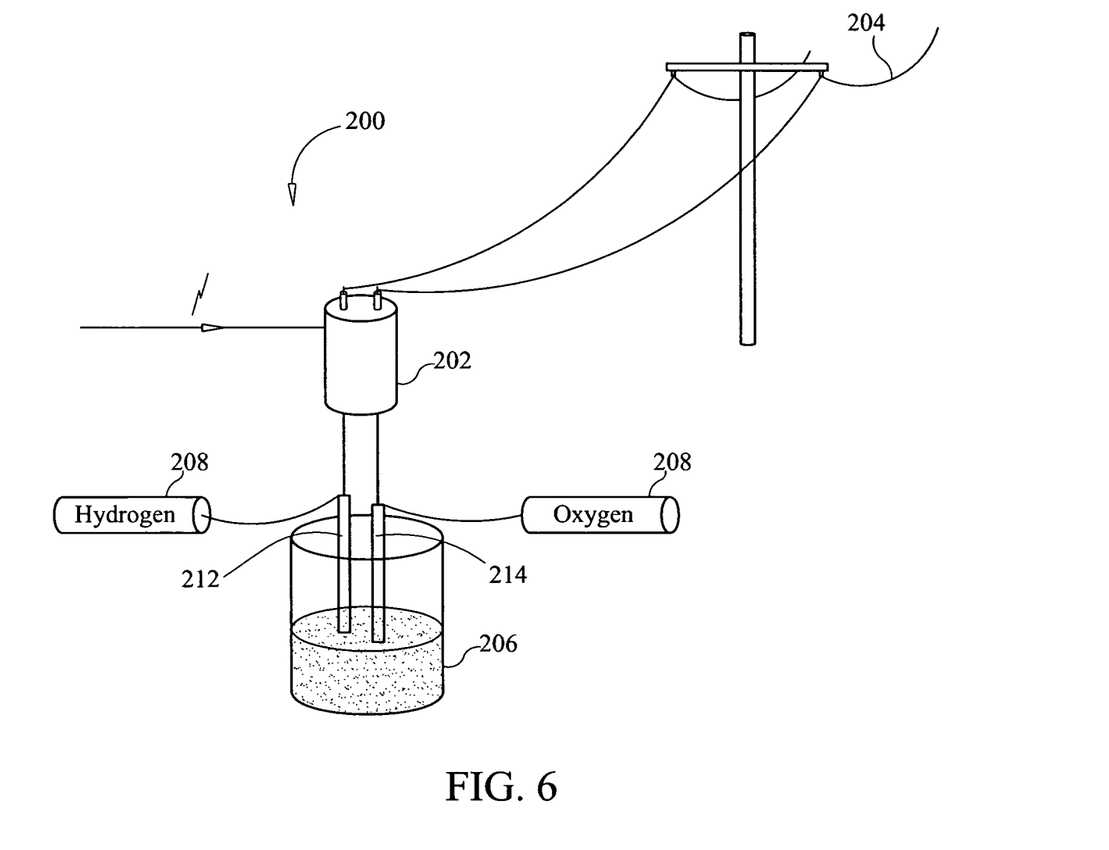
FIG. 6 illustrates a system for the electrolysis of water using electricity generated from heat and gases during a metal melting and/or smelting process in an embodiment of the present invention.

As illustrated in FIG. 6, a system 200 is illustrated whereby electricity generated from the embodiments of the present invention may be routed to a transformer 202. The electricity generated may be utilized by the metal melting and/or smelting facility. Alternatively, the electricity generated by the embodiments described herein may be sent to a utility grid 204. Alternatively and/or in addition, the electricity may be utilized to drive water electrolysis in an electrolysis system 206 to form hydrogen gas 208 and/or oxygen gas 210 via electrodes 212, 214.

Figure 7:
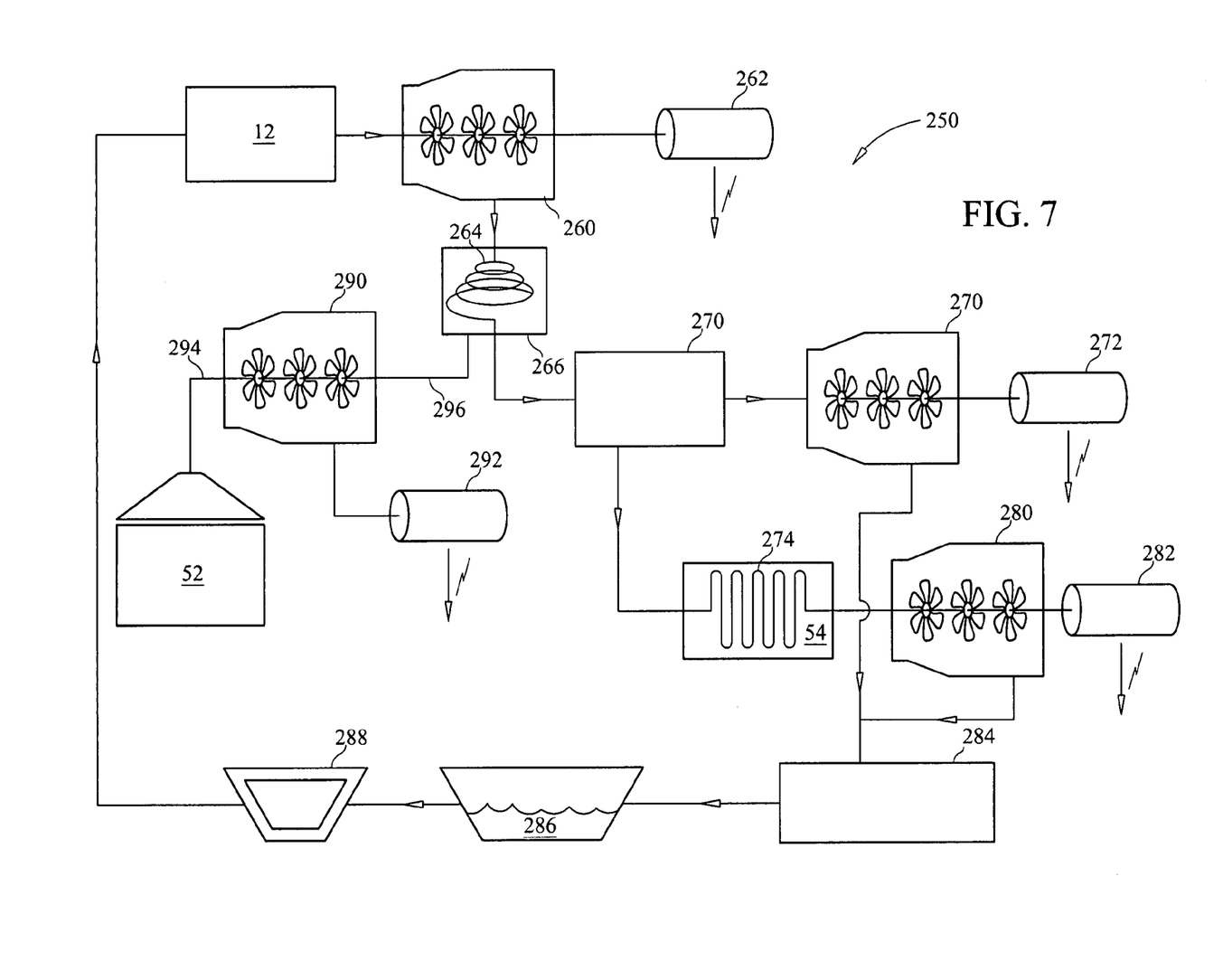
FIG. 7 illustrates a system for driving turbines from heat and gases from a metal melting and/or smelting vessel, a slag pot and a slag box in an alternate embodiment of the present invention.

In a preferred embodiment of the present invention, a system 250 is illustrated in FIG. 7. Steam from cooling panels and/or coils from in and around smelting vessel 12 drive a steam turbine 260 to generate electricity in a generator 262. The steam is then reheated in reheat coils 264 in a heat exchanger 266 and flows into a condenser 270 whereupon the steam partially recondenses. Steam that does not condense flows to a steam turbine 270 to generate electricity by a generator 272. The steam that condenses in condenser 270 flows to the slag box 54 whereupon the water reheats by flowing through liquid-filled conduit 274 whereupon the steam generated by this heat exchange drives a steam turbine 280 to generate electricity by a generator 282. Water from the steam turbine 270 and the steam turbine 280 may condense in a condenser 284 to flow to a cooling pond 286 and further to a cooling tower 288. The water is then recirculated back to the metal melting and/or smelting vessel 12.

Heated flue gases off-gassed from the slag pot 52 are captured and routed via conduit 294 to drive a gas turbine 290 to generate electricity by a generator 292. The heated flue gases are then routed via conduit 296 and heat the reheat coils 264 within the heat exchanger 266 to reheat the water from the steam turbine 260. The flue gases are then released to the atmosphere, scrubbed, contained, or otherwise disposed of, as apparent to one having ordinary skill in the art.

With respect to particular energy production utilizing the invention as described herein focusing on just the slag, it is estimated that approximately 80,000 lb/hr of slag input into the system will produce approximately 5,119 Megawatts of electricity using the system described herein. This production of electricity assumes a mass flow rate through the system, based on available heat from the slag, of 41,958 lb/hr and a turbine limit of 1000 degrees F. and 2000 psi. However, it should be noted that increases in electricity generation may occur if the system is able to run at higher temperatures and pressures. For example, the system may be utilized at 1600 degrees F. or more. Moreover, calculations on the steam turbines indicate that an optimal pressure and velocity at the turbines exhaust flange should be 2.9557 psig (6 mm Hg) at a steam velocity of 200 ft/s.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for generating electricity during a metal melting and/or smelting process comprising:
   a vessel containing heated material generated during smelting of metal ore and/or the melting of metal to form a purified metal;
   flue gases emanating from the vessel;
   a flue gas conduit for routing the flue gases from the vessel;
   a gas turbine connected to the flue gas conduit wherein the flue gases are routed to the gas turbine and drive the gas turbine;
   a first electricity generator connected to the gas turbine wherein the first electricity generator generates electricity when the gas turbine is driven by the flue gases; and
   a channel connecting the vessel to a second vessel for transporting a portion of the heated material to the second vessel and further wherein the second vessel has a second conduit containing a liquid that vaporizes due to heat from the second vessel.

2. The system of claim 1 further comprising:
   a liquid-filled conduit wherein heat from the flue gases vaporize liquid within the liquid-filled conduit for driving a second turbine.

3. The system of claim 1 further comprising:
   a liquid-filled conduit disposed in close proximity to the vessel wherein heat from the vessel vaporizes liquid within the liquid-filled conduit for driving a second turbine.

4. The system of claim 1 wherein the vaporized liquid within the second conduit drives a second turbine.

5. The system of claim 1 further comprising:
   an electrolysis system having water and electrodes wherein the electricity generated from the first electricity generator is directed to the electrodes and electrolyzes the water producing hydrogen gas and oxygen gas.

6. A system for generating electricity during a metal melting and/or smelting process, the system comprising:
   a vessel containing heated material generated during the process;

a conduit containing a liquid within the conduit wherein the conduit is disposed in close proximity to the vessel wherein the liquid contained within the conduit vaporizes due to heat from the vessel and the heated material generated during the process;

a first turbine connected to the conduit wherein the vaporized liquid drives the first turbine;

a first electricity generator connected to the first turbine wherein the first electricity generator generates electricity when the first turbine is driven by the vaporized liquid; and a channel connecting the vessel to a second vessel for transporting a portion of the heated material to the second vessel and further wherein a second conduit containing a second liquid is disposed in close proximity to the second vessel wherein the liquid contained within the conduit vaporizes due to heat from the second vessel.

7. A system for generating electricity during a metal melting and/or smelting process, the system comprising:

a vessel containing heated material generated during the process;

a conduit containing a liquid within the conduit wherein the conduit is disposed in close proximity to the vessel wherein the liquid contained within the conduit vaporizes due to heat from the vessel and the heated material generated during the process;

a first turbine connected to the conduit wherein the vaporized liquid drives the first turbine;

a first electricity generator connected to the first turbine wherein the first electricity generator generates electricity when the first turbine is driven by the vaporized liquid;

a first condenser connected downstream from the first turbine wherein the vaporized liquid flows into the first condenser after driving the first turbine wherein the vaporized liquid condenses within the first condenser; and a channel connecting the vessel to a second vessel for transporting a portion of the heated material to the second vessel and further wherein a second conduit containing a second liquid is disposed in close proximity to the second vessel wherein the liquid contained within the conduit vaporizes due to heat from the second vessel.

* * * * *